United States Patent
van Bemmel (10) Patent No.: US 9,521,028 B2
(45) Date of Patent: Dec. 13, 2016

(54) METHOD AND APPARATUS FOR PROVIDING SOFTWARE DEFINED NETWORK FLOW DISTRIBUTION

(71) Applicant: Alcatel-Lucent Canada Inc., Ottawa (CA)

(72) Inventor: Jeroen van Bemmel, Calgary (CA)

(73) Assignee: Alcatel Lucent, Boulogne-Billancourt (FR)

( * ) Notice: Subject to any disclaimer, the term of this patent is extended or adjusted under 35 U.S.C. 154(b) by 673 days.

(21) Appl. No.: 13/912,709

(22) Filed: Jun. 7, 2013

(65) Prior Publication Data

US 2014/0365680 A1    Dec. 11, 2014

(51) Int. Cl.
*G06F 15/16* (2006.01)
*H04L 29/06* (2006.01)
*H04L 29/08* (2006.01)
*H04L 12/715* (2013.01)

(52) U.S. Cl.
CPC .............. *H04L 29/06* (2013.01); *H04L 45/64* (2013.01); *H04L 67/2814* (2013.01); *H04L 67/327* (2013.01)

(58) Field of Classification Search
CPC ...... H04L 29/06; H04L 45/64; H04L 67/2814; H04L 67/327
USPC ................................. 709/232, 238, 245, 250
See application file for complete search history.

(56) References Cited

U.S. PATENT DOCUMENTS

| | | | |
|---|---|---|---|
| 8,898,402 B1* | 11/2014 | Stronge | G06F 3/0605 711/100 |
| 2010/0017802 A1* | 1/2010 | Lojewski | G06F 12/1072 718/1 |
| 2011/0235508 A1 | 9/2011 | Goel et al. | |
| 2013/0132532 A1* | 5/2013 | Zhang | H04L 41/0823 709/220 |

FOREIGN PATENT DOCUMENTS

WO    2013074844 A1    5/2013

OTHER PUBLICATIONS

PCT International Search Report and Written Opinion, dated Jul. 21, 2014 (PCT/CA2014/050516) 7 pages.
Uppal, Hardeep et al, "Open Flow Based Load Balancing", 7 pages.
Wang, Richard, et al, "OpenFlow-Based Server Load Balancing Gone Wild", 6 pages.
"OpenFlow, Multipath Proposal", http://archive.openflow.org/wk/index.php/Multipath_Proposal, pp. 1-10.
McKeown, Nick et al, "OpenFlow: Enabling Innovation in Campus Networks", Mar. 14, 2009, 6 pages.
Wang,Richard, "Open-Based Low balancing Gone Wild", Master's Thesis, May 2011, pp. 1-25.

\* cited by examiner

*Primary Examiner* — Viet Vu
(74) *Attorney, Agent, or Firm* — Kramer & Amado, P.C.

(57) ABSTRACT

Various embodiments provide a method and apparatus for providing SDN flow distribution without requiring per-connection state in the network. In particular, the SDN flow distribution is realized in network elements within the forwarding path of packets by providing in those network elements with a controller capable of mapping traffic flows onto a set of target servers.

17 Claims, 5 Drawing Sheets

FIG. 1
100

FIG. 4
400

METHOD AND APPARATUS FOR PROVIDING SOFTWARE DEFINED NETWORK FLOW DISTRIBUTION

TECHNICAL FIELD

The invention relates generally to methods and apparatus for providing software defined network flow distribution.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known software defined network (SDN) flow distribution systems solutions, a dedicated device is configured as a load balancer that implements flow distribution through load balancing.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections.

Various embodiments provide a method and apparatus for providing SDN flow distribution without requiring per-connection state in the network. In particular, the SDN flow distribution is realized in network elements within the forwarding path of packets by providing in those network elements with a controller capable of mapping traffic flows onto a set of target servers.

In a first embodiment, an apparatus is provided for providing in-path flow distribution. The apparatus includes: a plurality of virtual machines; a data storage and a processor communicatively connected to the plurality of virtual machines and the data storage. The data storage includes a rules portion including a plurality of rules and a server's list portion. Where at least a subset of the plurality of rules map packet flow to one or more of the plurality of virtual machines based on the servers list portion. The processor is programmed to: receive a packet from an edge router; determine a rule from the plurality of rules based on the packet; determine a virtual machine based on the rule and the servers list portion; modify a destination address of the packet based on the virtual machine; and forward the packet to the virtual machine.

In a second embodiment, a method is provided for providing in-path flow distribution by a processor communicatively connected to a data storage. The data storage includes a rules portion including a plurality of rules and a servers list portion. Where at least a subset of the plurality of rules map packet flow to a virtual machine based on the servers list portion. The method includes: receiving a packet from an edge router; determining rule from the plurality of rules based on the packet; determining a virtual machine based on the rule and the servers list portion; modifying a destination address of the packet based on the virtual machine; and forwarding the packet to the virtual server.

In a third embodiment, a non-transitory computer-readable storage medium is provided for storing instructions which, when executed by a computer, cause the computer to perform a method. The method includes:

19. A non-transitory computer-readable storage medium storing instructions which, when executed by a computer, cause the computer to perform a method, the method including: receiving a packet from an edge router; wherein the data storage comprises a rules portion comprising a plurality of rules and a servers list portion, wherein at least a subset of the plurality of rules map packet flow to a virtual machine based on the servers list portion; determining a rule from the plurality of rules based on the packet; determining a virtual machine based on the rule and the servers list portion; modifying a destination address of the packet based on the virtual machine; and forwarding the packet to the virtual server.

In some of the above embodiments, the apparatus is a first host in a network of a plurality of hosts; wherein the virtual machine is a member of a second plurality of virtual machines hosted on a second host, the second host being a member of the plurality of hosts; and wherein at least a second subset of the plurality of rules map packet flow to one or more of the second plurality of virtual machines based on the servers list portion.

In some of the above embodiments, the destination address is a MAC address.

In some of the above embodiments, the rule comprises a distribute portion, the distribute portion specifying a distribution action.

In some of the above embodiments, the data storage further includes a hash array portion comprising an array of server index values and the servers list portion comprises a set of server addresses. Where the determination of the virtual machine is further based on further programming the processor to select the virtual machine from the set of server addresses using a server index determined based on the rule. Where the array of server index values includes the server index.

In some of the above embodiments, the processor is further programmed to: determine that the packet initiates a packet flow. Where the modification of the destination address of the packet is based on the determination that the packet initiates the packet flow.

In some of the above embodiments, the determination that the packet initiates a packet flow is based on a SYN flag in the packet.

In some of the above embodiments, the processor is further programmed to: receive a second packet from the edge router, the second packet comprising a server value identifying the virtual machine; modify a destination address of the second packet based on the server value; and forward the second packet to the virtual machine.

In some of the above embodiments, the server value is in a TCP ACK field of the second packet.

In some of the above embodiments, the server value is a server index value; and the processor is further programmed to determine the virtual machine based on the server index value and the servers list portion.

In some of the above embodiments, the data storage further comprises a history portion; and the processor is further programmed to: receive a third packet from the edge router; determine that the third packet is a retransmission; retrieve a prior server value from the history portion based on the determination that the third packet is a retransmission and the third packet; modify a destination address of the third packet based on the prior server value; and forward the third packet to the virtual machine.

In some of the above embodiments, the processor is further configured to: receive a second packet from the edge router, the second packet comprising a server value identifying the virtual machine; determine that a corresponding server index value in the array of server index values is a trigger value; set the corresponding server index value to the server value; modify a destination address of the second packet based on the server value; and forward the second packet to the virtual machine.

In some of the above embodiments, the determining the virtual machine is further based on selecting the virtual machine from the set of server addresses using a server index determined based on the rule. Where the array of server index values comprises the server index.

In some of the above embodiments, the method further includes: determining that the packet initiates a packet flow. Where the modification of the destination address of the packet is based on the determination that the packet initiates the packet flow.

In some of the above embodiments, the method further includes: receiving a second packet from the edge router, the second packet comprising a server value identifying the virtual machine; modifying a destination address of the second packet based on the server value; and forwarding the second packet to the virtual machine.

In some of the above embodiments, the method further includes receiving a second packet from the edge router, the second packet comprising a server value identifying the virtual machine; determining that a corresponding server index value in the array of server index values is a trigger value; setting the corresponding server index value to the server value; modifying a destination address of the second packet based on the server value; and forwarding the second packet to the virtual machine.

In some of the above embodiments, the data storage further includes a history portion and the method further includes: determining a historical server index value associated with the virtual machine; storing the historical server index value in the history portion; receiving a second packet from the edge router, the second packet comprising a server value; determining a second rule from the plurality of rules based on the second packet; determining a second server index value based on the rule and the servers list portion; retrieving the historical server index value based on a determination that the server value does not correspond to the second server index value; modifying a destination address of the second packet based on the historical server index value; and forwarding the second packet.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, the various embodiments described herein are not necessarily mutually exclusive, as some embodiments may be combined with one or more other embodiments to form new embodiments.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

Various embodiments provide a method and apparatus for providing SDN flow distribution without requiring per-connection state in the network. In particular, the SDN flow distribution is realized in network elements within the forwarding path of packets by providing in those network elements with a controller capable of mapping traffic flows onto a set of target servers.

Advantageously, by configuring network elements in the forwarding path of packets with a controller, SDN flow distribution may be accomplished that is resilient against failures (e.g., a single point of failure (SPOF) is not created) and scales with varying client traffic loads (e.g., provides rapid elasticity).

Figure 1:
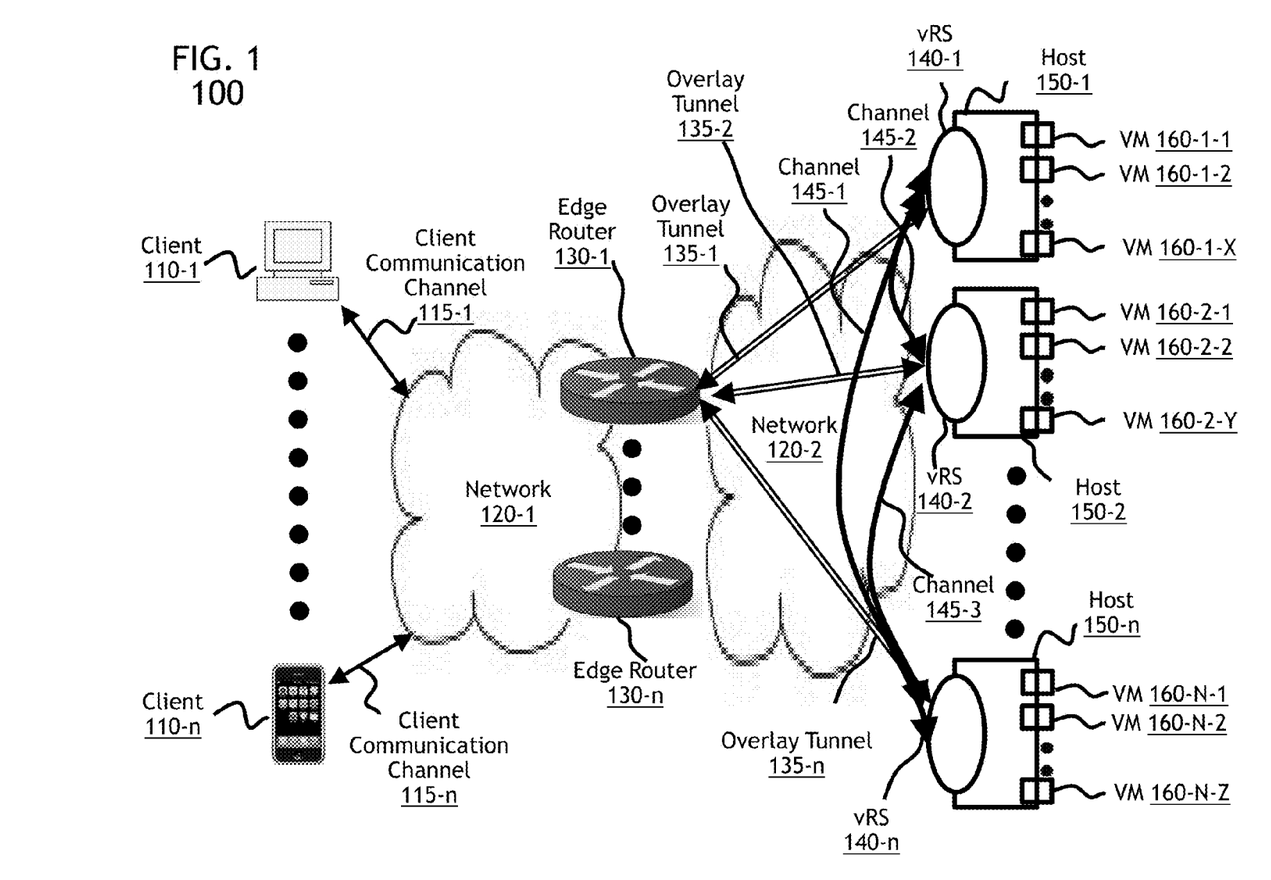
FIG. 1 illustrates an embodiment of an SDN flow distribution system 100 for providing SDN flow distribution.

FIG. 1 illustrates an embodiment of an SDN flow distribution system 100 for providing SDN flow distribution. The SDN flow distribution system 100 includes one or more clients 110-1-110-$n$ (collectively, clients 110) accessing one or more applications (not shown for clarity) residing on one or more hosts host 150-1-host 150-$n$ (hosts 150) through a communication flow established over a communication path. The communication path includes an appropriate one of links 115-1-115-$n$ (collectively, links 115), network 120-1, an appropriate one of edge routers 130-1-130-$n$ (collectively, edge routers 130), and an appropriate one of overlay tunnels 135-1-135-$n$ (collectively, overlay tunnels 135) through network 120-2.

As defined herein, "a flow" is broadly construed as two or more packets having common characteristics such as: (i)

source IP; (ii) source port; (iii) destination IP; (iv) destination port; (v) protocol; or (vi) the like.

In some embodiments, a flow is two or more packets sharing the same 5-tuple <src.ip, src.port, dst.ip, dst.port, protocol>.

Clients 110 may include any type of communication device(s) capable of sending or receiving information (e.g., packets) over network 120-1 via one or more of links 115. For example, a communication device may be a thin client, a smart phone (e.g., client 110-*n*), a personal or laptop computer (e.g., client 110-1), server, network device, tablet, television set-top box, media player or the like. Communication devices may rely on other resources within the exemplary system to perform a portion of tasks, such as processing or storage, or may be capable of independently performing tasks. It should be appreciated that while two clients are illustrated here, system 100 may include fewer or more clients. Moreover, the number of clients at any one time may be dynamic as clients may be added or subtracted from the system at various times during operation.

Links 115 and overlay tunnels 135 support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 115 and overlay tunnels 135 may be any number or combinations of communication channels.

Channels channel 145-1-channel 145-*n* (collectively, channels 145) illustrate communication paths between ones of hosts 150 and should be broadly construed to include any suitable communication path. For example, a channel may be link as described above or an internal communication channel. Referring to channel 145-1, if host 150-1 and host 150-2 reside on the same apparatus, an internal communication channel may be internal processors and memory programmed to pass information between hosts 150-1 and 150-2.

The network 120-1 and 120-2 include any number of access and edge nodes and network devices and any number and configuration of links. Moreover, it should be appreciated that networks 120-1 and 120-2 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like. Moreover, it should be appreciated that though illustrated as two separate networks, network 120-1 and 120-2 may share all or portions of a network. For example, network 120-2 may reside within network 120-1.

Edge routers 130 are apparatus capable of routing traffic between one or more of clients 110 and hosts 150. In particular, edge routers 130 select one of overlay tunnels 135 to route client packets to a particular one of hosts 150. It should be appreciated that while two edge routers are illustrated here, system 100 may include fewer or more edge routers. It should be further appreciated that similar to edge router 130-1, illustrated edge router 130-*n* may be configured to route packets to a set of hosts (e.g., hosts 150) via one or more overlay tunnels (not depicted for purposes of clarity).

Each of select hosts 150 include one or more of virtual router or switch vRS 140-1-140-*n* (collectively, vRSs 140) and one or more of virtual machines VM 160-1-1-VM 160-N-Y (collectively, virtual machines 160). For example, as illustrated, host 150-1 includes vRS 140-1 and virtual machines VM 160-1-1-160-1-X.

vRSs 140 provide a controller for in-path flow distribution. In particular, vRSs are configured with matching rules which map packets from traffic flows toward a target server such as one of virtual machines 160 or another physical or virtual server (not illustrated for the purpose of clarity). For a target server resident on another host, packets may be directed to the target server via one or more of channels 145.

As defined herein, "in-path flow distribution" is construed as requiring the flow distribution decisions to be made by a component normally resident within the communication path. For example, edge routers 130 and hosts 150 are within the communication path of a client request. In contrast, offloading flow distributions decisions to a separate manager communicatively connected to network 120-2 or to a dedicated load balancer positioned between one of edge routers 130 and hosts 150 is not in-path flow distribution.

In some embodiments of edge routers 130, one or more of edge routers 130 performs ECMP (Equal Cost Multi Path) routing on TCP packets destined to a virtual load distributor IP address and optionally limited to one or more ports (e.g. port 80 for web traffic). In some of these embodiments, selection of one of overlay tunnels 135 is accomplished by hashing the source IP and optionally port of the received packet.

In some embodiments, vRSs 140 is configured with matching rules for TCP traffic to certain load balancer IP:port destinations, and tables for mapping such flows onto a set of target servers (e.g. through hashing). In some of these embodiments, the target servers are configured to be local to the receiving host.

In some embodiments, vRSs 140 includes a provisionable array of N server index values, mapping to a list of S server addresses or ports. In some of these embodiments, Open Flow is extended to include a 'distribute' action which, when matched, calculates a hash index value for an incoming packet (e.g. based on src IP and src port) and forwards the packet to the server and optionally port determined by using the array index.

It should be appreciated that all or a portion of the functionality of one or more of vRSs 140 may be included within one or more of edge routers 130.

Figure 2:
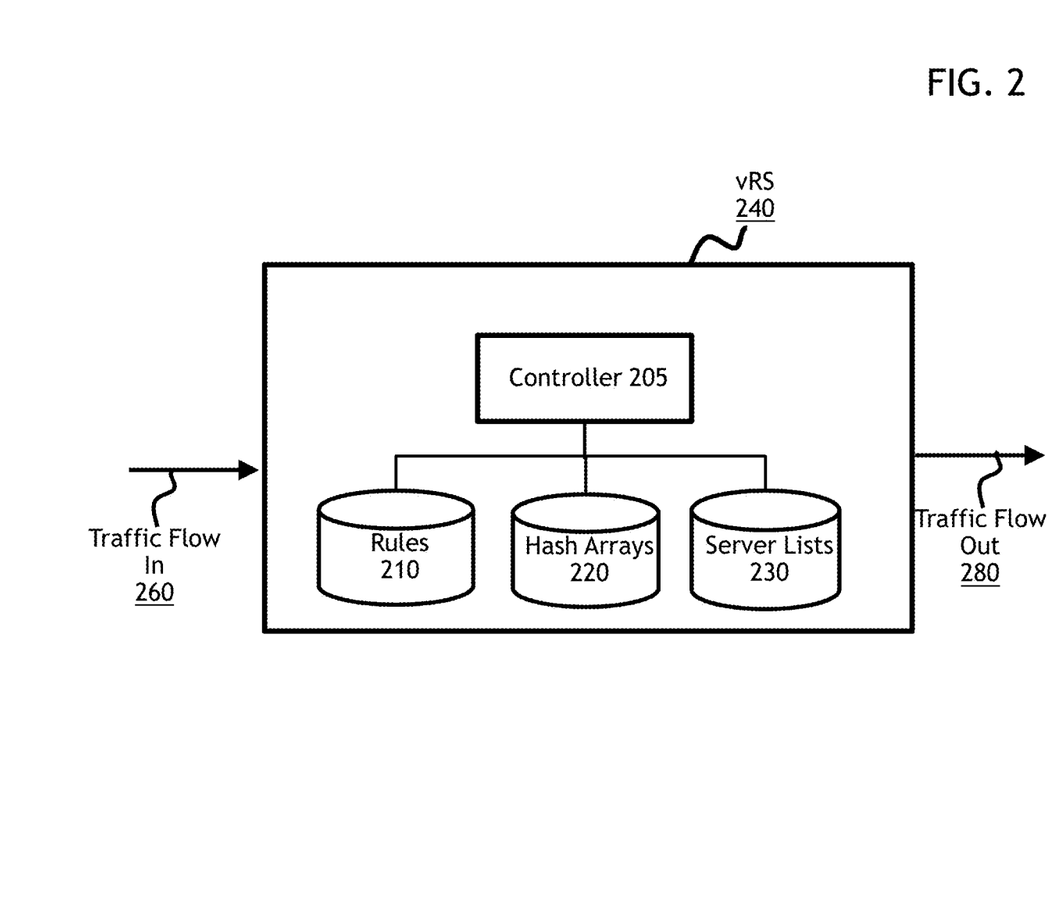
FIG. 2 schematically illustrates a vRS 240 that is an embodiment of one of vRSs 140 of FIG. 1.

FIG. 2 schematically illustrates a vRS 240 that is an embodiment of one of vRSs 140 of FIG. 1. The vRS 240 includes a controller 205 that is communicatively connected to data storage rules 210, hash arrays 220, and server lists 230 and is configured for distributing packets belonging to a traffic flow received on traffic flow in 260 to one or more suitable servers over traffic flow out 280.

Rules 210 is provisioned with matching rules for flow traffic (e.g., TCP traffic). In particular, if a rule match for a traffic flow received over traffic flow in 260 is determined, then a distribution determination is made for the received traffic flow. The distribution determination includes using a hash array from hash arrays 220 and a server list from server lists 230 for mapping the received packets onto a set of target servers (e.g. through hashing).

It should be appreciated that though rules 210, hash arrays 220 and server lists 230 are depicted as three separate data stores, storage of rules 210, hash arrays 220 and server lists 230 may include any suitable configuration (e.g., two or more of rules 210, hash arrays 220 and server lists 230 may share physical or virtual storage or memory space). Moreover, rules 210, hash arrays 220 and server lists 230 may be maintained in any suitable format including: tables, databases, or the like.

As an example, the rules, hash arrays and server lists storage of an apparatus (e.g., vRS 240 of FIG. 2) are configured where rules 210 includes a set of X rules, where hash array 220 includes a set of X arrays of A server index values (e.g., of N bits each, e.g. N=4 for max 16 servers), and where server lists 230 includes a set of Y server address (or port) lists (of max length 2^N each) as given below for server array=servers(A, B, C, D).

Rules 210:
1. For all packets with dst.ip==1.2.3.4 and dst.port==80, set dst.ip to server address from list L1 using hash array A1
2. For all packets with dst.ip==1.2.3.5 and dst.port==80, set dst.mac to server address from list L2 using hash array A2

Hash Arrays 220:
1. A1=[0, 1, 2, 3, 0, 1, 2, 3]
    //(25% equitable distribution across all 4 servers. Advantageously, server indexes may be represented using two (2) bits per value.)
2. A2=[0, 0, 0, 0, 0, 0, 1, 1]
    //(75%/25% distribution between 2 servers)

Server Lists 230:
1. L1=[10.20.30.40, 10.20.30.41, 10.20.30.42, 10.20.30.43]
    //(contains IPv4 addresses for servers [A, B, C, D])
2. L2=[11:22:33:44:55:66, 11:22:33:44:55:67]
    //(contains MAC addresses)

To further the example, assume a packet is received with a destination IP="1.2.3.4", a destination port=80. Referring to rules 210, rule (1) matches the destination IP and port and thus, rule 1 is selected to map the flow distribution of the received packet. Assume that the hash action includes hashing the source IP+source port and that the resultant hash has a value of "1234" which maps to an index="2" (e.g., "1234" % 8). Using rule (1), the server index=2 (i.e., A1[2]) which corresponds to target server C (i.e., L1(2)).

Referring again to rule(1), the dst.ip would then be set to server "C" and the packet will be forwarded to target server "C".

In some of these embodiments, the protocol is enhance to include a 'distribute' action which references a particular array of hash arrays "A", and a particular array of server lists "S". The distribute action may also contain directions on which fields to include for hashing (e.g. hash the src ip address, hash src ip+port, etc.), and directions for modifications to apply on matching packets (e.g. replace destination IP address, MAC address).

For example, where '*' denotes wildcard matching, a rule may be:
protocol=TCP, src IP=*, src port=*, dst IP=1.2.3.4, dst port=80=>action=distribute(hash=src IP+src port, array=a,
serverlist=1, modify=dst IP)

In some of these embodiments, when an incoming packet matches the filter portion of the rule (e.g., protocol=TCP, src IP=*, src port=*, dst IP=1.2.3.4, and dst port=80), then the action portion of the rule (e.g., action=distribute(hash=src IP+src port, hash array=a, serverlist=I, modify=dst IP) is performed. In the example above, a 'distribute' action is performed. In particular, the action portion of the example instructs the controller to perform a hash calculation on the "src IP+src port" to determine hash value "h" used in determining the server index "i". In some embodiments, the server index "i" is determined by using i:=a[h % A] (i.e. the server index at index (h % A) of array a, where A is the number of entries in A and '%' represents modulo). A server S may be determined from the server index by using S:=s[i]. Finally, the packet's destination IP is modified as specified in the rule and the packet is forwarded to the given server using conventional switching techniques. It should be appreciated that server S may be directly determined by using the equivalent algorithm, "S:=s[a[h % A]]".

In some embodiments, the rule includes one or more of the following:
1. A directive to modify the packet (e.g., to replace the destination IP with the IP of the server).
2. A directive for the fields to be used in hashing (e.g., src IP+src port).
3. A directive for the array indices or server list to use.

In some embodiments, the distribute action includes using server weights to direct different amounts of flow traffic to different servers.

In some embodiments, hash arrays 220 or server lists 230 are periodically updated based received load information (e.g., the server weights are adjusted to compensate for load).

In some embodiments, the array of server indices based on received load information (e.g. sending relatively more traffic to less loaded/faster responding servers), for example after every X connection requests or every T seconds In some embodiments, the apparatus is a modified Open-Switch compliant switch.

In some embodiments, a modification to OpenFlow enables the controller to specify that SYN packets or SYN+ACK packets for a flow matching a 'distribute' action should be forwarded. In some of these embodiments, the servers insert a custom TCP option in SYN and return load information. In some embodiments, the controller updates the distribution of traffic based on the load information or response times of the servers.

In some embodiments, a modification to OpenFlow enables the controller to enable keep-alive filtering for the rule created for the 'distribute' action.

In some embodiments, received packets include the server index value used in the hashing action. In some of these embodiments, the server index value is placed in the upper n bits of the TCP ACK field.

In some embodiments, a modification to OpenFlow enables the switch (e.g., vRS 140-1 of FIG. 1) or controller (e.g., vRS 140-1 or edge router 130-1 (e.g., if controller functionality is included within the edge router) of FIG. 1) to reconstruct the contents of the server index array based on incoming packets (e.g., to support failover scenarios).

In some embodiments, the controller provisions a secondary switch (e.g., vRS 140-2 of FIG. 1) with an initial array of server indexes and the same list of servers as the primary switch (e.g., vRS 140-1 of FIG. 1). The server indexes are set to 'trigger' upon notification to recover from a switch failure or for use as a hot standby. When the primary switch fails, traffic is redirected to the secondary switch and packets from existing connections trigger notifications to the controller. The controller extracts the server index value from the packet (e.g. from the ACK field), updates the array entry based on the packet's hash value with this value, and instructs the secondary switch to forward the packet to the corresponding server. Subsequent packets arriving at the secondary switch for that flow, or any other flow hashing to the same bucket, are then automatically forwarded to the proper server without intervention. This process continues until all entries in the server index array are populated with values other than the special 'trigger' value or after a fixed time interval upon which the controller updates the server index array by replacing any remaining 'trigger' values with indices of real servers.

In some embodiments, the switch maintains a history of X previous contents per server index array. Upon receiving a packet containing the original server index value used in establishing the connection, the switch compares this server index value with the value in its server index array. If there is a mismatch (e.g. because the contents of the array was changed since the TCP connection started), the switch searches the history to determine if any of the previous X values matched, and if so, forwards the packet to the identified server. Advantageously, by forwarding to the correct server instead of breaking the connection by forwarding to the new, wrong server, connection state is maintained and an RST is not required to be sent by the new server. In some embodiments, the history (per server index array entry) is an N-bit bit mask where each bit represents a server index value used at one point for that specific hash bucket. In some embodiments, the 'history check' for an incoming packet with hash h containing server index value v is (1<<v) & index_array[h].history_mask. Advantageously, the 'history check' may be a single operation efficiently performed in hardware.

Advantageously, since the state information maintained at the network elements and the controller is independent of flow instances, the scalability limits induced by the limited size of the rule table may be reduced. Thus, an OpenFlow controller and vRS pair may support increased traffic flows. Moreover, since the number of rules maintained for load distribution is small (e.g., one in each direction per target TCP port in each vRS) and independent of the number of flows, rule table space may be reserved for other functions. Furthermore, failover is simplified because dynamic state is not involved and since the amount of storage required by the hash arrays 220 and server lists 230 is limited and constant, data may be programmed into persistent storage or communicated over the network very quickly and addition of new vRS instances or target servers is possible without breaking existing flows.

Figure 3:
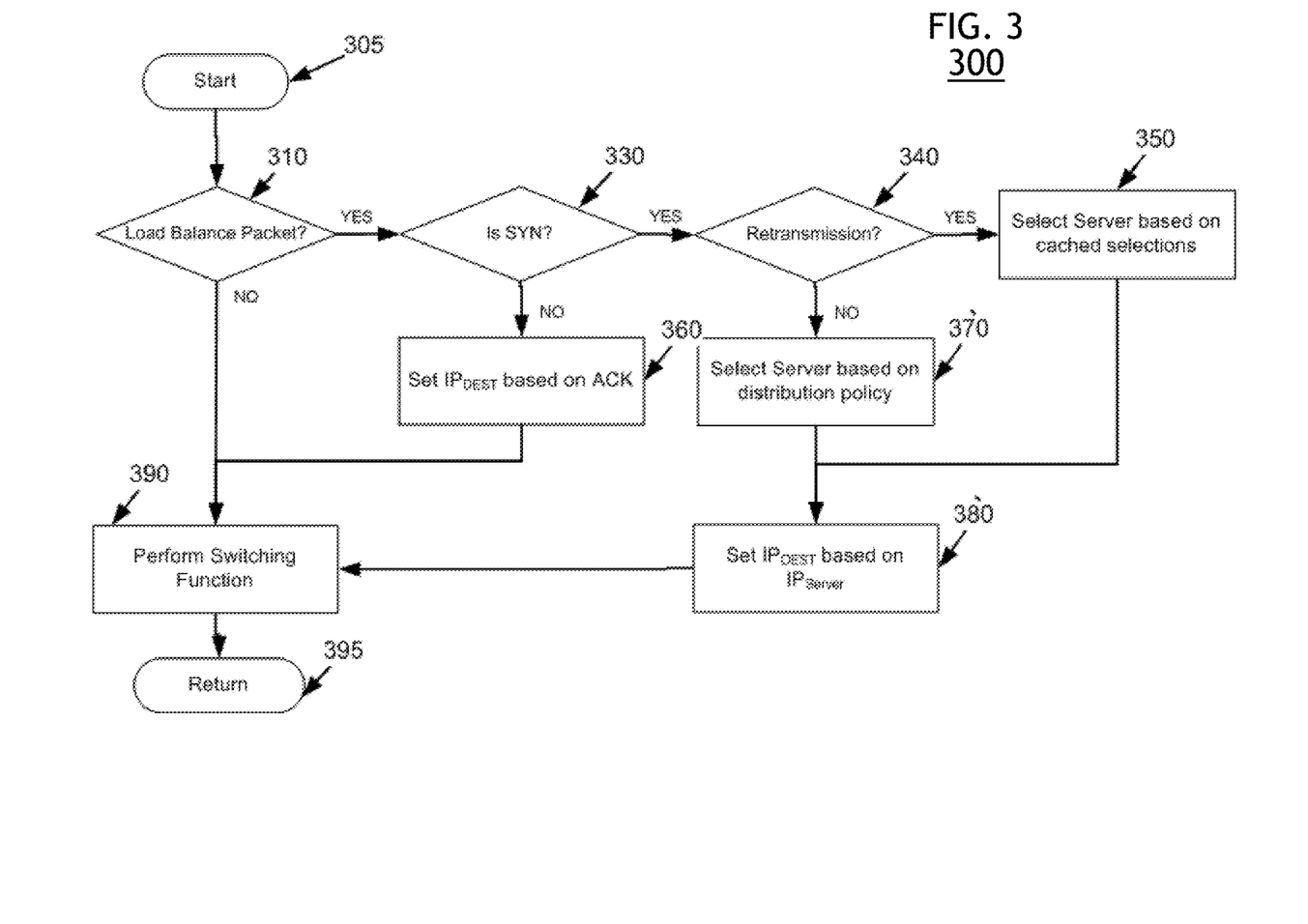
FIG. 3 depicts a flow chart illustrating an embodiment of a method 300 for a controller (e.g., controller 205 of FIG. 2) to provide a TCP flow distribution.

FIG. 3 depicts a flow chart illustrating an embodiment of a method 300 for a controller (e.g., controller 205 of FIG. 2) to provide a TCP flow distribution. The method begins at step 305 and includes: determining whether a packet received from an edge router (e.g., one or edge routers 130 of FIG. 1) meets load balancing criteria (step 310). If not, the method proceeds to step 390. If the packet meets load balancing criteria, the method optionally includes checking the TCP flags for a SYN flag (step 330). If the SYN field is set, the method proceeds to step 340, else, the destination IP address is updated based on the ACK (step 360). The method optionally includes determining if the packet is a retransmission (step 340) and selecting a server based on cached selections if the packet is a retransmission (step 350). If a packet is not a retransmission or a check to determine whether the packet is a retransmission is not performed, a server is selected based on a distribution policy (step 370). Steps 350 and 370 proceed to step 380 where the destination IP address of the packet is set based on the server IP address (step 380) and then the packet is forwarded based on the destination IP address (step 390) and the method ends (step 395).

In the method 300, step 310 includes determining whether a packet received from an edge router (e.g., one or edge routers 130 of FIG. 1) meets load balancing criteria (step 310). Load balancing criteria may include any suitable packet characteristics such as for example, packet protocol (e.g., TCP or UDP), packet source or destination IP address, or packet source or destination port. In some embodiments, a packet meets load balancing criteria when the packet is a TCP packet and matches a provisioned load balancer IP:port pair. If the packet meets load balancing criteria, the method proceeds to step 330, else the method proceeds to step 390.

The method 300 optionally includes steps 330 and 360. Step 330 includes checking whether the SYN flag is set. If the SYN flag is set, the method proceeds to step 340, else the method proceeds to step 360. In step 360, the destination IP address is set based on the ACK field. It should be appreciated that though illustrated as a SYN flag, any suitable indicator that identifies a packet as a first packet of a flow from the initiating side may be used. Moreover, it should be appreciated that any suitable field may be used to carry IP address information and that the ACK field is just one example of a suitable field.

Advantageously, by using LS-TCP for non-SYN packets, existing flows are not broken when configuration changes are made (e.g., adding, removing, or moving VMs).

In the method 300, the step 340 includes determining if the packet is a retransmission by known methods. If the packets is a retransmission, the method proceeds to step 350 else the method proceeds to step 370.

In the method 300, the step 350 includes selecting a server based on cached selections. In particular, the apparatus performing the method searches a cache of recent server selections and determines the server that was used for the previous transmission.

In the method 300, the step 370 includes selecting a server based on a distribution policy. In particular, the server is selected based on a determined rule as described in FIG. 2.

In the method 300, the step 380 includes setting the destination IP address based on the selected server. In some embodiments, the destination IP address is set to the IP address of the selected server. In other embodiments, the destination IP address is set based on a subset of the IP address of the selected server. In some of these embodiments, the destination IP address is set according to [Eq 0.1].

$$\text{set } IP_{DEST}[24:31] := IP_{SelectedServer}[24:31] \quad \text{[Eq. 1]}$$

In the method 300, the step 390 includes performing conventional packet switching based on the destination IP address.

In some embodiments of step 360, the destination IP address is set based on a lookup. In some of these embodiments, a portion of a field such as the TCP ACK field contains a server index identifying the IP address (complete IP address or subset thereof) of the selected server. In some of these embodiments, the TCP ACK field further contains an array index identifying the server list array containing the server. In some embodiments the server index and optionally array index is used to retrieve the IP address of the server (e.g., $IP_{SelectedServer}$=server_lists[array index][server index]). In some of these embodiments, a table(s) may be updated (e.g., by a primary server before failover).

In some embodiments of step 360, the destination IP address is set based on one or more bits of the TCP ACK field. In some of these embodiments, the upper "n" bits of the TCP ACK field are set. In some of these embodiments, the destination IP address is set according to [Eq 0.2].

$$\text{set } IP_{DEST}[24:31] := ACK[0:7] \quad \text{[Eq. 2]}$$

In some embodiments of the steps 330 and 360, a server index is inserted by the server into packets from the server. In some of these embodiments, insertion is accomplished by modifying the TCP stack.

In some embodiments of the steps 330 and 360, a server index is inserted by the vRS into packets from the server. Advantageously, no changes are required to be made at the server, however, per connection state must be maintained and packets may be required to be modified so the server does not break the connection due to unrecognized packets.

In some embodiments, stateless filtering of TCP keep-alive is implemented in the vRS depending on flow configuration (i.e. a flag in the rule to enable/disable per load balancer application).

In some embodiments, DDoS mitigation algorithms are implemented in the vRS, e.g. by only allowing 1 connection per client src IP within the (short) caching time interval, blacklisting certain IP source addresses or ranges, or performing trend analysis on traffic patterns. In some of these embodiments, triggers may be implemented to automatically instantiate additional VMs to deal with traffic spikes.

Although primarily shown as modified IP destination headers in steps 360 and 380, it should be appreciated that some embodiments may use modified layer 2 destination addresses (MAC) instead of or in addition to modifying IP destination headers. Advantageously, by using layer 2 destination addresses, TCP/IP header checksums are not required to be updated, and servers may use the same IP address as the virtual load balancer IP such that no rewriting of the destination IP address is required in the return direction.

Figure 4:
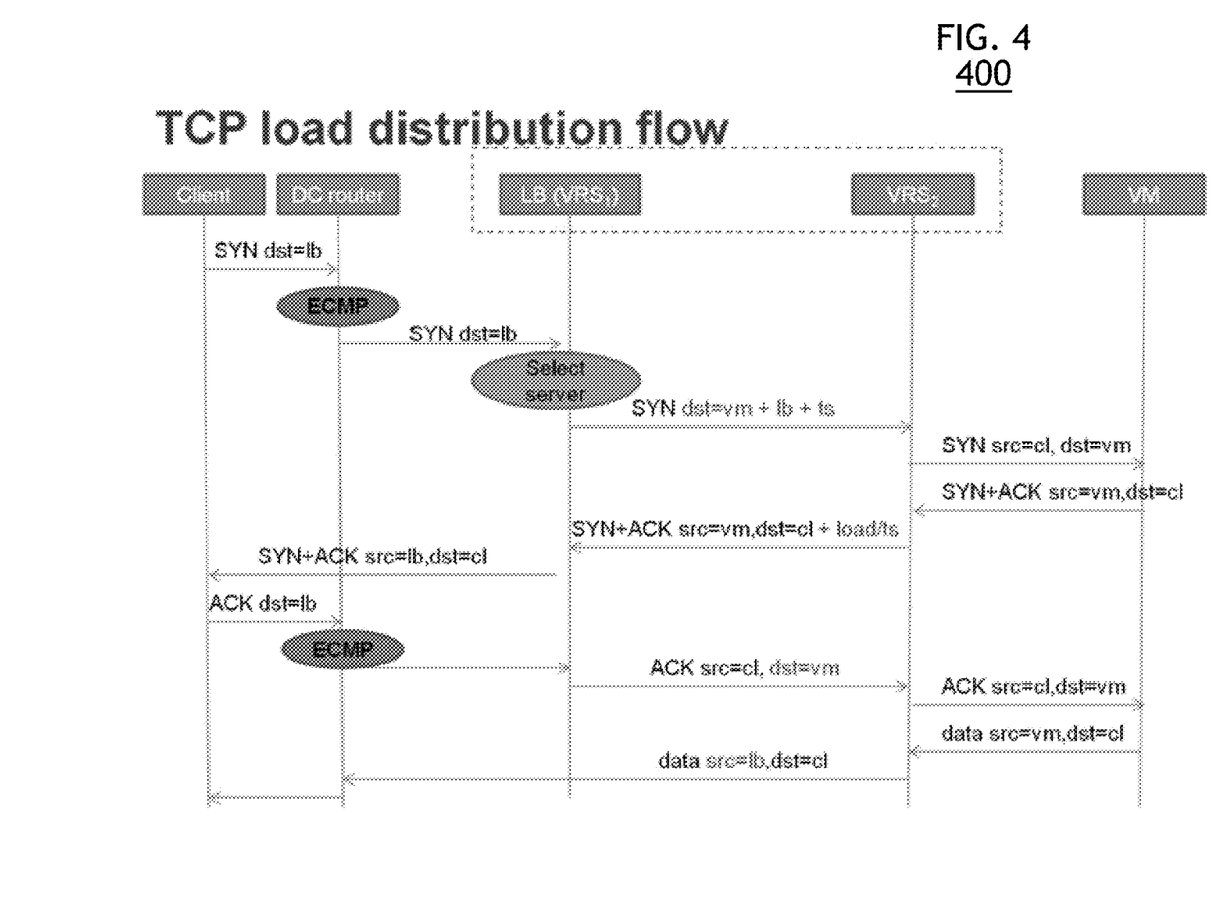
FIG. 4 depicts an exemplary message flow illustrating an embodiment of method 300 for performing TCP load distribution.

FIG. 4 depicts an exemplary message flow illustrating an embodiment of method 300 for performing TCP load distribution. The message flow is an end-to-end message flow between a client (e.g., client 110-1 of FIG. 1) and a virtual machine (e.g., VM 160-1-1 of FIG. 1) via a DC router (e.g., edge router 130-1 of FIG. 1) and one or more physical or virtual routers/switches (e.g., one or more of vRSs 140 of FIG. 1) labeled as VRS$_1$ and VRS$_2$.

It should be appreciated that a SYN flag indicates a first packet of a flow from the initiating side and a SYN+ACK flag indicates a first packet of a flow from the responding side.

In some embodiments, if the selected target server is not local, the first vRS (e.g., VRS$_1$) must forward all TCP packets to a second vRS (e.g., VRS$_2$) (after modifying the destination IP). The second vRS may then perform standard switching on the received TCP packets. In some embodiments, packets flowing in the reverse direction may be forwarded directly to the edge router (resulting in asymmetric routing/switching).

Although primarily depicted and described in a particular sequence, it should be appreciated that the steps shown in method 300 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 5:
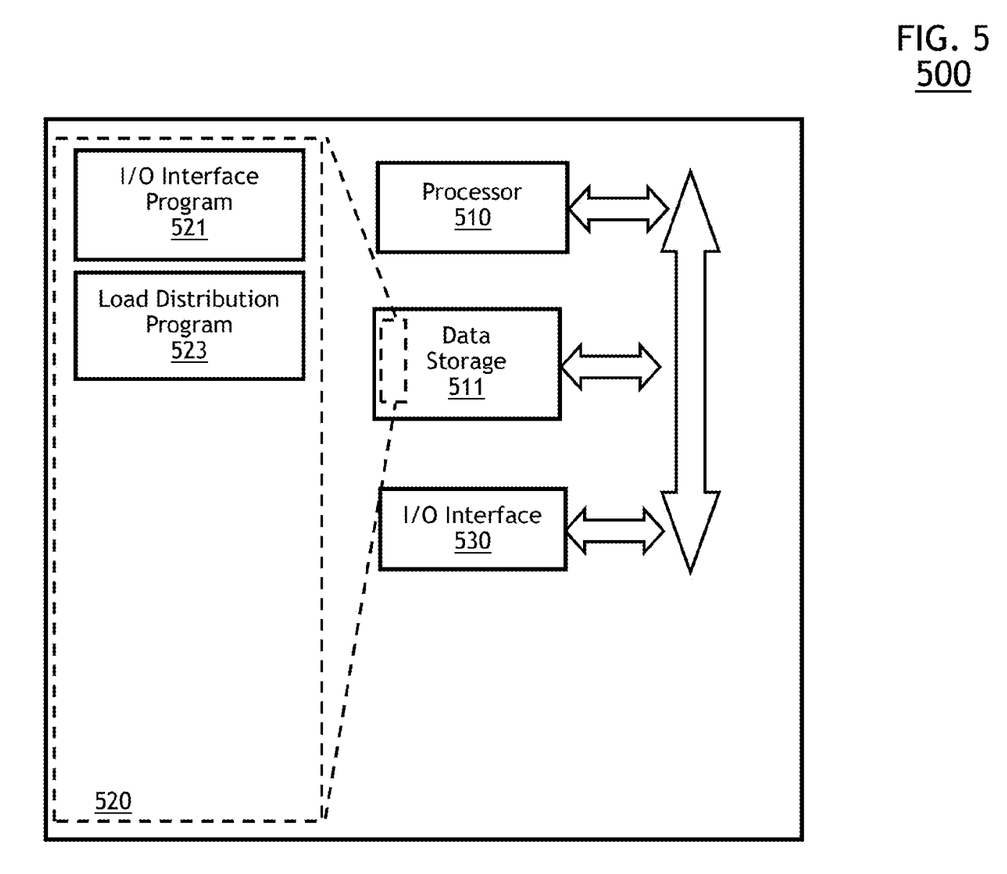
FIG. 5 schematically illustrates an embodiment of various apparatus 500 such as one of vRSs 140 of FIG. 1.

FIG. 5 schematically illustrates an embodiment of various apparatus 500 such as one of vRSs 140 of FIG. 1. The apparatus 500 includes a processor 510, a data storage 511, and optionally an I/O interface 530.

The processor 510 controls the operation of the apparatus 500. The processor 510 cooperates with the data storage 511.

The data storage 511 stores programs 520 executable by the processor 510. Data storage 511 may also optionally store program data such as rules 210, hash arrays 220 server lists 230 of FIG. 2, or the like as appropriate.

The processor-executable programs 520 may include an I/O interface program 521, or a load distribution program 523. Processor 510 cooperates with processor-executable programs 520.

The I/O interface 530 cooperates with processor 510 and I/O interface program 521 to support communications over overlay tunnels 135 or channels 145 of FIG. 1 as described above. The I/O interface program 521 performs one or more of the steps of 310 or 390 of FIG. 3 as described above and as appropriate.

The load distribution manager program 523 performs one or more of the steps of the method 300 of FIG. 3 as described above and as appropriate.

In some embodiments, the processor 510 may include resources such as processors/CPU cores, the I/O interface 530 may include any suitable network interfaces, or the data storage 511 may include memory or storage devices. Moreover the apparatus 500 may be any suitable physical hardware configuration such as: one or more server(s), blades consisting of components such as processor, memory, network interfaces or storage devices. In some of these embodiments, the apparatus 500 may include cloud network resources that are remote from each other.

In some embodiments, the apparatus 500 may be one or more virtual machine(s). In some of these embodiments, one or more of the virtual machine(s) may include components from different machines or be geographically dispersed. For example, the data storage 511 and the processor 510 may be in two different physical machines.

When processor-executable programs 520 are implemented on a processor 510, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing in-path flow distribution, the apparatus comprising:
    a plurality of virtual machines;
    a data storage comprising a rules portion comprising a plurality of rules and a servers list portion, wherein at least a subset of the plurality of rules map packet flow to one or more of the plurality of virtual machines based on the servers list portion; and
a processor communicatively connected to the plurality of virtual machines and the data storage, the processor being configured to:
    receive a packet from an edge router;
    determine a rule from the plurality of rules based on the packet;
    determine a virtual machine based on the rule and the servers list portion;
    modify a destination address of the packet based on the virtual machine;
    forward the packet to the virtual machine;
    wherein the data storage further comprises a hash array portion comprising an array of server index values:
wherein the servers list portion comprises a set of server addresses;
and wherein the determination of the virtual machine is further based on further configuring the processor to select the virtual machine from the set of server addresses using a server index determined based on the rule;
    wherein the array of server index values comprises the server index.

2. The apparatus of claim 1, wherein the apparatus is a first host in a network of a plurality of hosts; wherein the virtual machine is a member of a second plurality of virtual machines hosted on a second host, the second host being a member of the plurality of hosts; and wherein at least a second subset of the plurality of rules map packet flow to one or more of the second plurality of virtual machines based on the servers list portion.

3. The apparatus of claim 1, wherein the destination address is a MAC address.

4. The apparatus of claim 1, wherein the rule comprises a distribute portion, the distribute portion specifying a distribution action.

5. The apparatus of claim 1, wherein the processor is further configured to:
    determine that the packet initiates a packet flow;
    wherein the modification of the destination address of the packet is based on the determination that the packet initiates the packet flow.

6. The apparatus of claim 5, wherein the determination that the packet initiates a packet flow is based on a SYN flag in the packet.

7. The apparatus of claim 1, wherein the processor is further configured to:
    receive a second packet from the edge router, the second packet comprising a server value identifying the virtual machine;
    modify a destination address of the second packet based on the server value; and
    forward the second packet to the virtual machine.

8. The apparatus of claim 7, wherein the server value is in a TCP ACK field of the second packet.

9. The apparatus of claim 7, wherein the server value is a server index value; and wherein the processor is further configured to determine the virtual machine based on the server index value and the servers list portion.

10. The apparatus of claim 7, wherein the data storage further comprises a history portion; and wherein the processor is further configured to:
    receive a third packet from the edge router;
    determine that the third packet is a retransmission;
    retrieve a prior server value from the history portion based on the determination that the third packet is a retransmission and the third packet;
    modify a destination address of the third packet based on the prior server value; and
    forward the third packet to the virtual machine.

11. The apparatus of claim 1, wherein the processor is further configured to:
    receive a second packet from the edge router, the second packet comprising a server value identifying the virtual machine;
    determine that a corresponding server index value in the array of server index values is a trigger value;
    set the corresponding server index value to the server value;
    modify a destination address of the second packet based on the server value; and
    forward the second packet to the virtual machine.

12. A method for providing in-path flow distribution, the method comprising:
    at a processor communicatively connected to a data storage, receiving a packet from an edge router;

wherein the data storage comprises a rules portion comprising a plurality of rules and a servers list portion, wherein at least a subset of the plurality of rules map packet flow to a virtual machine based on the servers list portion;

determining, by the processor in cooperation with the data storage, a rule from the plurality of rules based on the packet;

determining, by the processor in cooperation with the data storage, a virtual machine based on the rule and the servers list portion;

modifying, by the processor in cooperation with the data storage, a destination address of the packet based on the virtual machine;

forwarding, by the processor in cooperation with the data storage, the packet to the virtual server;

wherein the data storage further comprises a hash array portion comprising an array of server index values:
wherein the servers list portion comprises a set of server addresses;
and wherein the determining the virtual machine is further based on selecting the virtual machine from the set of server addresses using a server index determined based on the rule;
   wherein the array of server index values comprises the server index.

13. The method of claim 12, further comprising:
determining, by the processor in cooperation with the data storage, that the packet initiates a packet flow;
wherein the modification of the destination address of the packet is based on the determination that the packet initiates the packet flow.

14. The method of claim 12, further comprising:
receiving, by the processor in cooperation with the data storage, a second packet from the edge router, the second packet comprising a server value identifying the virtual machine;
modifying, by the processor in cooperation with the data storage, a destination address of the second packet based on the server value; and
forwarding, by the processor in cooperation with the data storage, the second packet to the virtual machine.

15. The method of claim 13, further comprising:
receiving, by the processor in cooperation with the data storage, a second packet from the edge router, the second packet comprising a server value identifying the virtual machine;
determining, by the processor in cooperation with the data storage, that a corresponding server index value in the array of server index values is a trigger value;
setting, by the processor in cooperation with the data storage, the corresponding server index value to the server value;
modifying, by the processor in cooperation with the data storage, a destination address of the second packet based on the server value; and
forwarding, by the processor in cooperation with the data storage, the second packet to the virtual machine.

16. The method of claim 12, further comprising:
wherein the data storage further comprises a history portion;
determining, by the processor in cooperation with the data storage, a historical server index value associated with the virtual machine;
storing, by the processor in cooperation with the data storage, the historical server index value in the history portion;
receiving, by the processor in cooperation with the data storage, a second packet from the edge router, the second packet comprising a server value;
determining, by the processor in cooperation with the data storage, a second rule from the plurality of rules based on the second packet;
determining, by the processor in cooperation with the data storage, a second server index value based on the rule and the servers list portion;
retrieving, by the processor in cooperation with the data storage, the historical server index value based on a determination that the server value does not correspond to the second server index value;
modifying, by the processor in cooperation with the data storage, a destination address of the second packet based on the historical server index value; and
forwarding, by the processor in cooperation with the data storage, the second packet.

17. A non-transitory computer-readable storage medium storing instructions which, when executed by a computer, cause the computer to perform a method, the method comprising:
receiving a packet from an edge router; wherein the data storage comprises a rules portion comprising a plurality of rules and a servers list portion, wherein at least a subset of the plurality of rules map packet flow to a virtual machine based on the servers list portion;
determining a rule from the plurality of rules based on the packet;
determining a virtual machine based on the rule and the servers list portion;
modifying a destination address of the packet based on the virtual machine; forwarding the packet to the virtual server;
wherein the data storage further comprises a hash array portion comprising an array of server index values;
wherein the servers list portion comprises a set of server addresses;
and wherein the determining the virtual machine is further based on selecting the virtual machine from the set of server addresses using a server index determined based on the rule:
   wherein the array of server index values comprises the server index.

* * * * *